(12) United States Patent
Bariere

(10) Patent No.: US 6,637,272 B1
(45) Date of Patent: Oct. 28, 2003

(54) MANOMETER WITH DIRECT PASSAGE

(75) Inventor: Paul-Edouard Bariere, Vendôme (FR)

(73) Assignee: Bourdon S.A., Vendome les Ulis (FR)

( * ) Notice: Subject to any disclaimer, the term of this patent is extended or adjusted under 35 U.S.C. 154(b) by 0 days.

(21) Appl. No.: 10/009,529

(22) PCT Filed: Jun. 23, 2000

(86) PCT No.: PCT/FR00/01773

§ 371 (c)(1),
(2), (4) Date: Dec. 12, 2001

(87) PCT Pub. No.: WO01/01098

PCT Pub. Date: Jan. 4, 2001

(30) Foreign Application Priority Data

Jun. 24, 1999 (FR) .............................. 99 08105

(51) Int. Cl.[7] .................................. G01L 7/08
(52) U.S. Cl. .............................. 73/715; 73/730; 73/732
(58) Field of Search ............... 73/715, 272 R, 73/732, 730; 181/381, 173

(56) References Cited

U.S. PATENT DOCUMENTS 6,120,458 A * 9/2000 Lia et al. .................... 600/490

FOREIGN PATENT DOCUMENTS

| EP | 0 208 955 | | 1/1987 | |
|----|-----------|---|--------|---|
| FR | 1289636 | | 8/1962 | |
| FR | 2166485 | | 8/1973 | |
| FR | WO-8602446 | * | 4/1986 | ............ G01L/9/06 |
| WO | WO 86/02446 | | 4/1986 | |

* cited by examiner

Primary Examiner—Edward Lefkowitz
Assistant Examiner—Jermaine Jenkins
(74) Attorney, Agent, or Firm—Nixon & Vanderhye PC

(57) ABSTRACT

A direct passage manometer includes a body into which at least two rectilinear channels open into a recessed curved surface at a central portion thereof. A diaphragm seals the curved surface at the center of the body and is fixed in place by a load cell. The load cell has a movement amplifying device and indicator mounted thereon. The movement amplifying device rests on the diaphragm, connects to the indicator and is fixed in place by the load cell. The opening holes of the two channels are elliptical in profile and machined so as to avoid any retention zones.

8 Claims, 2 Drawing Sheets

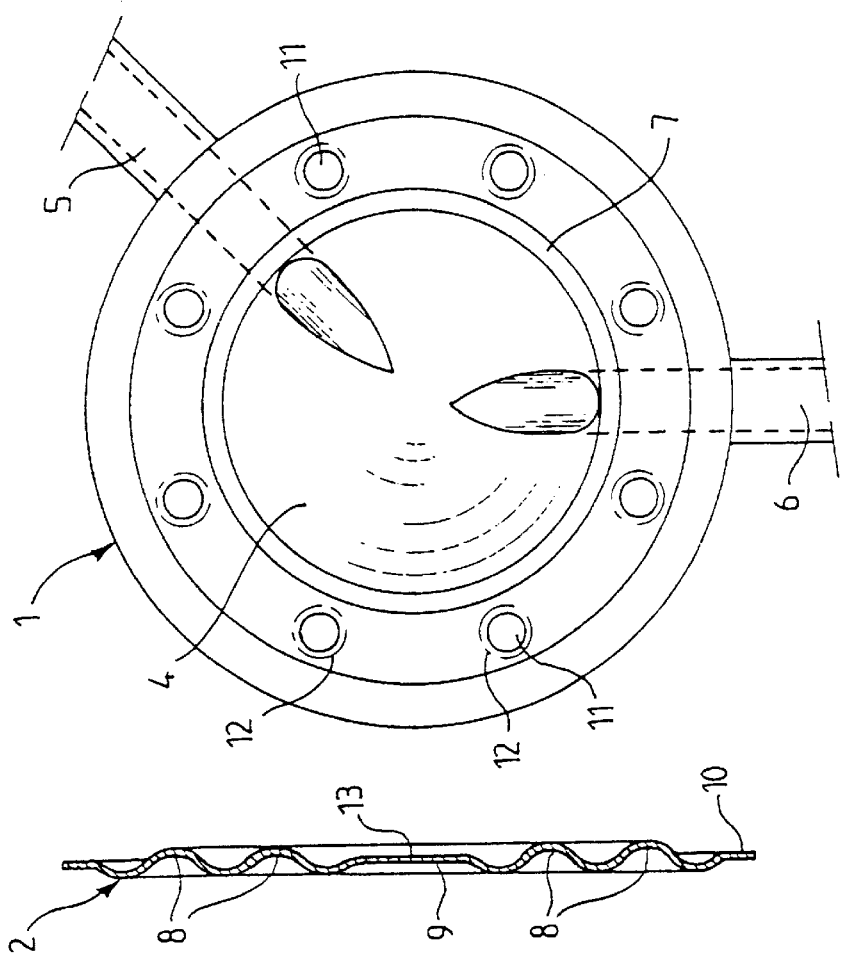
FIG. 5
FIG. 4
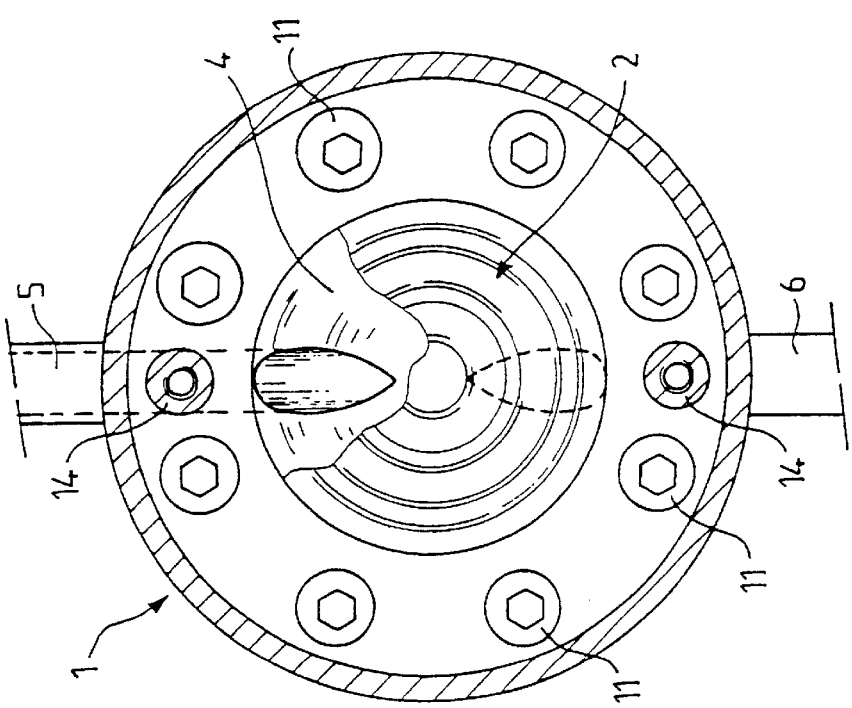
FIG. 3

MANOMETER WITH DIRECT PASSAGE

This application is the US national phase of international application PCT/FR00/01773 filed Jun. 23, 2000 which designated the U.S.

FIELD OF THE INVENTION

The present invention relates to a device for pressure measurement on a line of various installations. It relates more particularly to a manometer whose design makes it possible, on the one hand, to avoid any dead space in the driving element, and on the other hand to offer very easy cleaning without the need to disconnect the measuring instrument from the process line or even dismantle it.

BACKGROUND OF THE INVENTION

Manometers of conventional design, whether of the Bourdon tube, capsule, or bellows type, etc., have driving elements containing a relatively large dead space, in which the fluid to be measured remains trapped.

In manometers of this type, it is in fact very difficult, if not impossible, to clean the said driving element, which is at a real dead end that is impossible to reach. Finally, the fluid whose pressure is being measured remains permanently trapped inside the driving element. For certain industries and applications, this phenomenon may be troublesome, because undesirable germs and bacteria can grow and multiply inside this dead end. Moreover, it is obvious that by virtue of its very shape, a Bourdon tube or bellows—whether it is drawn without welding, or rolled and welded then drawn—cannot have a perfect internal surface condition whatever treatments are applied to it.

Assuming that the internal surface condition is correct, the welds produced—at the end of the tube and for fixing the tube to the connector—give rise to the presence of impurities inside the tube.

Treatments such as electropolishing, treatment in the "extrudom" or other treatments, may claim to improve the internal surface condition of a really small part of the Bourdon tube, but in no case can they make it sufficiently clean and free from all impurities.

Conventional driving elements, of whatever form (Bourdon tube, bellows, capsule, etc.), prove to be real pockets for particles, which are impossible to clean efficiently, and whose internal surface condition in contact with the medium to be measured is incompatible with industries requiring high degrees of cleanliness and purity.

Furthermore, during changes in manufacture, the user may wish to clean the lines and the measuring instruments that are installed on the latter. In the case of manometers, such cleaning is impossible, unless the manometer is separated from the installation by means of an intermediate component, called a separator. This separator makes it possible to isolate the measuring instrument from the line, and serves as a "buffer". The separator is equipped with a diaphragm that is in contact with the fluid to be measured, whilst a filling liquid (generally an oil) provides transmission of the pressure existing in the installation between this diaphragm and the driving element of the manometer.

The use of a separator may give rise to problems and is not always ideal. The performance of a separator largely depends on the mechanical characteristics of the diaphragm itself (its response curve), on the quality of the filling liquid, its thermal stability, its viscosity, the filling conditions, etc. In addition, hermeticity between this diaphragm and the line of the installation is provided by a seal, which also offers retention zones where germs, bacteria and microbial flora can develop.

Furthermore, the use of a filling liquid in the separator means there is a risk of contaminating the entire installation equipped in this way, if diaphragm rupture occurs.

In addition, a separator is an added item, independent of the manometer, which adds an extra cost to the final product.

Even so, manometers, whether or not they are mounted on a separator, are reliable instruments for measuring pressure, whose performance meets the requirements of the majority of industrial applications.

There are fields of application or industries where the drawbacks mentioned above become preponderant. This applies in particular to the food and agricultural industries, fine chemicals, the pharmaceutical industry, the semiconductor manufacturing industry, industries producing or using pure, rare and toxic gases, industries where pressure measuring instruments are used in painting processes, etc.

In all these industries or applications, the use of pressure measuring instruments demands very stringent precautions, especially with regard to the presence of impurities, germs, dust etc. The measuring instruments used in these types of processes must be able to be cleaned very easily.

In food and agricultural industries, for example, the processors need to measure the pressure of foodstuff liquid or pastes intended for human or animal consumption. Consequently, equipment for carrying out these measurements must never under any circumstances allow the growth and development of germs or bacteria that might alter or contaminate the foodstuffs whose pressure is being measured. Therefore the measuring instruments must be designed in such a way that the retention zones are almost non-existent, and in such a way that they are easy to clean (i.e. they must be designed in such a way that they can easily be cleaned by passing cleaning products, hot water, or other decontaminating products through the lines of the installation).

Similar problems arise in the pharmaceutical industry, fine chemicals industry, etc.

In the field of gas distribution in the semiconductor industry, manometers are mainly used for measuring the pressure of two groups of gases:

Gases that are called "pure gases", which have extremely exacting requirements in terms of purity: ultrapure nitrogen; argon; helium; etc. These are generally gases for which the degrees of purity may reach or exceed 99.99999%.

Gases called "doping gases"—generally highly toxic gases (arsine, boron—gallium, etc.)—for doping the silicon wafers on which electronic components are produced, such as memories (RAM, DRAM), microprocessors, etc.

In this industry it is necessary to employ measuring instruments that have been made following very rigorous procedures in terms of cleanliness, so that there is no risk of contaminating the gases that are used.

Furthermore, all retention zones are forbidden, because, in this case too, they promote the development of undesirable germs or bacteria.

Moreover, for example in pressure measurement on lines for painting processes, depending on the operations being carried out, the pressure measuring instruments have to measure the pressure of paints of different colours. Between two manufacturing operations, the manometers must be easy to clean and must not have any retention zones where paint from the previous manufacturing operation might contaminate the next manufacturing operation.

The examples given above are not limiting. There are many other manufacturing processes where the measuring instruments installed on the production lines must be as easy to clean as possible, with a design that does not permit any retention zones promoting the development of germs, bacteria and other substances that could contaminate the production process or the constituents that are involved in the said production process, such as, in particular, liquids, gases, etc.

It is clear from the foregoing that these instruments must, as far as possible, be able to be cleaned or rinsed. In this context, it can be seen that conventional manometers do not offer this facility by any means, and that their use poses enormous problems, unless they are combined with separators.

To overcome these drawbacks, the main manufacturers of pressure measuring instruments have in recent years developed devices called "full-bore pressure transmitters" which avoid these contamination problems. In fact, various technologies derived from recently developed technologies in electronics have made it possible to devise pressure measuring instruments in which the driving element (the element that makes it possible to transform a physical quantity—pressure—into an electrical signal) is quite simply a tube, and the "fluid" whose pressure is to be measured circulates inside this tube. There are, for example, pressure transmitters that are completely free from retention zones and that offer maximum ease of cleaning. This equipment consists of a tube, on which a flat surface is machined, the dimensions and machining tolerances of which are known precisely. Film-screen strain gauges, arranged as a Wheatstone bridge (a network of resistances), are carefully positioned and glued on this flat surface. When this network of resistances is supplied with an external voltage, the Wheatstone bridge supplies an electrical signal whose value varies as a function of the deformation of the strain gauges when a pressure is exerted on the inside wall of the tube (at the level of the flat surface).

The output signal of the Wheatstone bridge therefore depends on the value of the resistances glued to this flat surface. The flat surface tends to be distorted under the action of the pressure. As it deforms, the flat surface also causes the strain gauges to undergo deformations, which are finally translated into a change in the value of each of the resistances or strain gauges. An immediate consequence is a change and/or deviation of the output signal at the terminals of the Wheatstone bridge under the action of the pressure. On the whole, the output signal is proportional to the deformation of the flat surface and hence to the pressure exerted by the fluid circulating in the tube on the zone of deformation of the said flat surface. The output signal of the Wheatstone bridge is then processed by an electronic system that generally supplies a current between 4 and 20 mA, corresponding respectively to zero pressure and to the maximum pressure for which the measuring instrument has been calibrated.

Transmitters of this type meet in full the requirements of cleanliness, purity and cleanability. But their use is subject to other constraints, the most important of which, for the user, is the need to provide an electrical supply to the Wheatstone bridge and hence to this type of pressure transmitter. The end user therefore has to make provisions for the laying of power cables on the installation and process for this equipment. In the semiconductor industry, for example, it is not uncommon to install several hundred pressure measuring instruments for monitoring the distribution of gases in the manufacturing process. Plant of this type can be heavy and expensive. Furthermore, only transmitters of this type must be combined with a unit for visualizing the measurement transmitted by the instrument: a display will permit visualization of the line pressure in real time.

Finally, a transmitter is usually more expensive than a manometer.

SUMMARY OF THE INVENTION

The present invention therefore aims to overcome these drawbacks, by proposing a device that is independent of any driving element and is autonomous in terms of energy source, and can largely eliminate problems connected with the purity, cleanliness and cleanability of the driving element.

For this purpose, the direct-passage manometer of the invention is characterized in that it has a body that is provided at its center with a hollowed curved surface, into which at least two transverse holes open, to allow the entry and exit of the fluid whose pressure is to be measured, this curved surface being sealed off by a diaphragm that is held in position on its seating by a load cell which interacts with the body via fixing means and orifices, the load cell being provided in addition with second fixing means for mounting a movement amplifying device resting on the diaphragm and connected to an indicator.

BRIEF DESCRIPTION OF THE DRAWINGS

Other characteristics and advantages of the present invention will become clear from the description given below, referring to the appended drawings illustrating an example of application thereof, which is in no way limiting. In the diagrams:

FIG. 3 is a plan view of the body of the manometer;

FIG. 4 is a sectional view and side view of a diaphragm used in the manometer of the invention;

FIG. 5 shows a variant of implementation of FIG. 3.

DETAILED DESCRIPTION OF THE INVENTION

Figure 2:
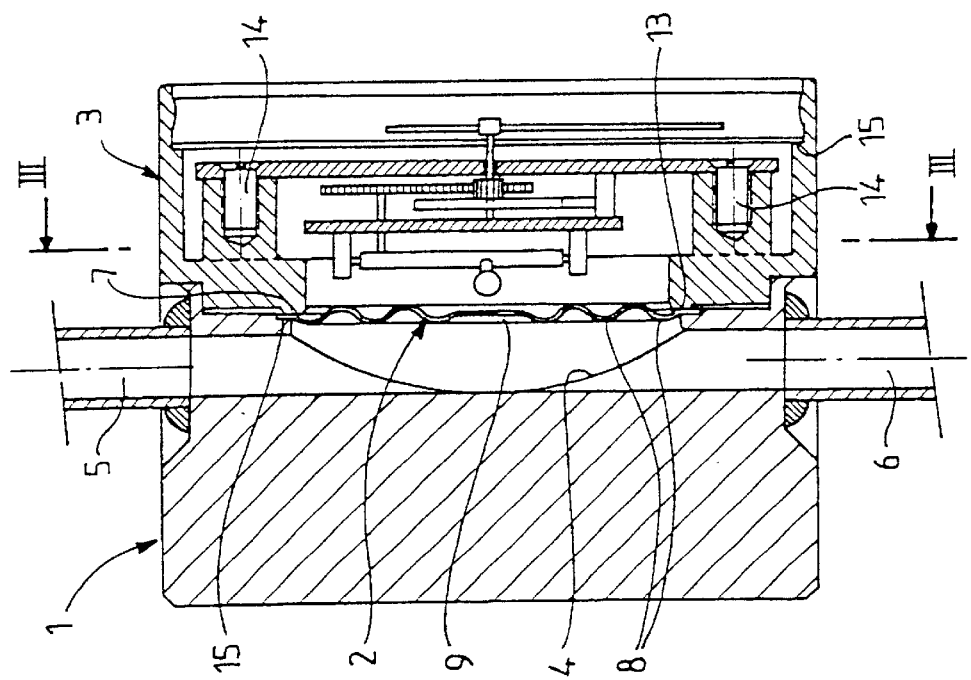
FIG. 2 is a sectional view and side view of FIG. 1.
Figure 1:
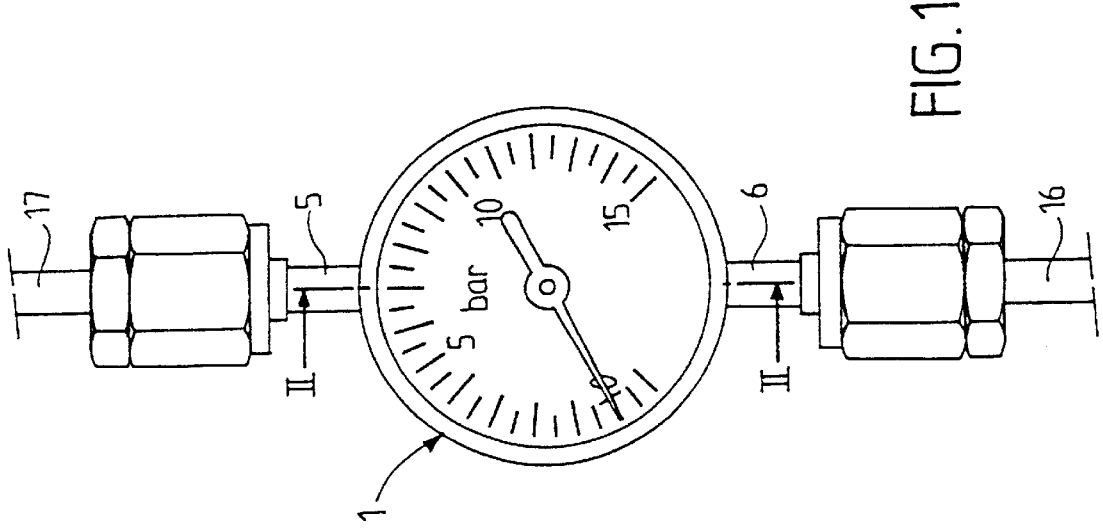
FIG. 1 is a plan view of a manometer according to the invention.

According to a preferred embodiment, reference may be made to FIGS. 1 and 2, in which the manometer body is represented by 1, the diaphragm by 2 and the load cell by 3, these three components being assembled together so as to form the manometer.

The body 1 is produced in a succession of machining operations so as to produce an approximately cylindrical component forming a base. The said component 1 is preferably machined in a metal draw frame especially of the stainless steel type, and has, roughly at its center, a recessed curved surface 4, for which the radius of curvature, the machining, the surface treatment and the surface condition make it possible to eliminate any retention zones, so that this manometer can be cleaned perfectly while in line.

At least two transverse holes 5, 6 open into the said curved surface 4 and their purpose is to permit the entry and exit of the fluid whose pressure is to be measured.

According to a first embodiment, these holes 5, 6 are positioned on the same generating line, especially on a diameter of body 1 (cf. FIG. 3).

According to a second embodiment, these holes 5, 6 are positioned on two intersecting generating lines (cf. FIG. 5).

Whatever the manner of implementation, the zones of intersection between the holes 5, 6 and the recessed curved surface 4 form an elliptical profile in which the connecting zones are also machined and treated in such a way as to avoid any retention zones.

According to another characteristic of the invention, the periphery of the recessed curved surface 4 is provided with a ring 7 which delimits a countersink that serves as a contact surface for the diaphragm 2.

The said diaphragm 2 completely covers the recessed curved surface 4 and receives the pressure forces resulting from passage of the fluid across the cavity via the two holes 5, 6 (cf. FIG. 4).

Diaphragm 2 is in the form of a metal disk having a plurality of concentric undulations 8, between which are delimited elastic strain zones.

In addition, the central part 9 of the said diaphragm is flat and delimits a zone of contact with a movement amplifying device, which is itself connected to a pinion which causes movement of a pointer on its shaft.

Furthermore, the peripheral part 10 of diaphragm 2 is flat and is positioned approximately in a median plane relative to the large number of concentric undulations distributed between the central part 9 and the peripheral part 10 of diaphragm 2. The role of this peripheral part 10 will be explained later.

Moreover, the said diaphragm 2 is obtained in particular by a drawing operation in metal strip which will then undergo a number of heat treatment operations as well as a number of surface treatment operations.

The choice of materials used and their treatments was rigourously studied and selected so as to permit optimum functioning, and in particular so as to offer excellent metrological performance (linearity, hysteresis, repeatability), and accordingly accuracy class 1 is achieved.

The body 1 of the manometer also has a number of fixing means 11, preferably equally spaced around ring 7.

These fixing means 11 are produced by drilling and tapping in body 1 of the manometer, so as to permit solid mounting of load cell 3.

Load cell 3 is made of a material similar to that of body 1, in a number of conventional machining operations as well as various operations of surface treatment.

Cylindrical overall, in the form of a hoop, this component is intended, on the one hand, for holding the diaphragm above the curved-surface cavity 4, and on the other hand for providing the mounting for the movement amplifying device as well as the graduated dial.

Thus, for performing these various functions, the hoop forming the load cell 3 has a number of holes 12 with angular positioning so that they match up with the fixing means 11 provided in body 1 of the manometer.

These holes 12 allow the passage of screws, studs or the like, which interact with the fixing means 11 and make it possible, by tightening the screws, for load cell 3 to be held on body 1.

According to another characteristic of the invention, since the face of the hoop has to be in contact with the peripheral part 10 of diaphragm 2, it has a shoulder or annular projection which delimits a contact surface 13 which permits, during mounting of load cell 3 on body 1, clamping of the peripheral part 10 at the level of the countersink 7 made in body 1.

Assembly of the manometer, at the level of the body 1 of diaphragm 2 of load cell 3, is effected without welding, and therefore without any risk of internal contamination. Installation of the manometer is of class 100, and of class 10 (under hoods with laminar flow) for certain operations, to avoid any risk of contamination.

Load cell 3 also has second fixing means 14 for mounting the measurement amplifying device, one end of which rests on the central part 9 of diaphragm 2, with the other end formed by a shaft for mounting the indicator, in particular in the form of a pointer.

In addition, the front part of hoop 3 has a series of shoulders 15 for passage of the dial, which rests on the fixing means 14, as well as for holding a cover which protects the dial and the pointer.

According to yet another characteristic of the invention, as shown in FIG. 1, holes 5 and 6 are connected to branch pieces that project laterally relative to body 1 of the manometer. These branch pieces 16, 17 receive various types of standardized, male or female connecting means, so as to permit installation of the manometer on the process line.

The invention as described above offers many advantages since the manometer constructed in this way has direct passage, with the particular feature of offering zero dead space, and moreover the cavity for measuring the pressure of the fluid is completely swept by the said fluid, thus preventing any retention zone that might adversely affect criteria of cleanliness.

Moreover, the construction, the form of the internal components, the machining operations, treatments and the surface condition of the various components forming the manometer make it possible to eliminate any retention zones, so that this manometer can be cleaned perfectly while in line. Owing to its design—with crimped rather than welded diaphragm—each component of this manometer can be treated so as to achieve an extremely high level of purity and cleanliness.

Of course, the present invention is not limited to the examples of application described and illustrated above, but encompasses all variants thereof.

What is claimed is:

1. A direct-passage manometer comprising:
    a body having a recessed curved surface at a central portion into which at least two channels open along intersecting lines for permitting direct passage entry and exit of fluid whose pressure is to be measured;
    a diaphragm that seals said curved surface and that seals against a seating member of said body;
    a load cell which holds said diaphragm against said sealing member by first fixing means;
    a movement amplifying device that rests on said diaphragm and that is connected to an indicator, said movement amplifying device being mounted on said load cell and being secured thereto by second fixing means;
    wherein said at least two channels are rectilinear and radial relative to said body and have opening holes into said recessed curved surface that form an elliptical profile, said opening holes being machined and treated so as to avoid any retention zones.

2. A manometer according to claim 1, wherein the channels are positioned along a diameter of said body.

3. A manometer according to claim 1, wherein the channels are positioned along two intersecting radii of said body.

4. A manometer according to claim 1, wherein a periphery of the recessed curved surface is provided with a ring which delimits a countersink serving as a contact surface of the diaphragm.

5. A manometer according to claim 4 wherein a face of the load cell, which is in contact with a peripheral part of the diaphragm, has a shoulder or annular projection that delimits a contact surface which permits, during mounting of the load cell on the body, crimping of the peripheral part of the diaphragm at the level of the countersink made on the body.

6. A manometer according to claim 1, wherein the diaphragm is in the form of a metal disk that has a number of concentric undulations between which are delimited zones of elastic strains.

7. A manometer according to claim 1, wherein a central part of the diaphragm is flat and delimits a zone of contact with the movement amplifying device.

8. A manometer according to claim 1, wherein a peripheral part of the diaphragm is flat and is positioned approximately in a median plane relative to the large number of concentric undulations distributed between a central part and a peripheral part of the diaphragm.

* * * * *